L. W. CHUBB.
ELECTROLYTIC RECTIFIER.
APPLICATION FILED DEC. 21, 1910.

1,156,666.

Patented Oct. 12, 1915.

WITNESSES:
Fred H Miller

INVENTOR
Lewis W. Chubb
BY
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTROLYTIC RECTIFIER.

1,156,666.  Specification of Letters Patent.  Patented Oct. 12, 1915.

Application filed December 21, 1910. Serial No. 598,635.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Electrolytic Rectifiers, of which the following is a specification.

My invention relates to electric apparatus and it has special reference to electrolytic rectifiers and similar devices comprising liquid-immersed electrodes.

The object of my invention is to provide a simple and durable device of the class above indicated that shall embody direct and positive means for cooling the electrodes with a view to materially increasing the maximum load, life and efficiency of the apparatus.

It has heretofore been very generally recognized that the life and efficiency of electrolytic rectifiers are greatly impaired by reason of the heat generated at the electrodes and many different forms of electrodes have been suggested for the purpose of overcoming this defect. The electrodes themselves have frequently been so constructed as to provide a very large exposed surface and, in some instances, special means have been provided for positively cooling the surrounding liquid. Neither of these methods, nor both of them combined, have proved sufficient by reason of the fact that the major part of the heat is generated at the electrodes with great rapidity and the surrounding liquid is inadequate, even if the surface of the electrodes is large, to conduct away the heat and to keep the electrodes at a temperature which is properly proportioned to the load on the apparatus.

According to my present invention, I provide hollow electrodes of aluminum, or other substance, capable of producing the requisite valve action, and a helical or zig-zag opposing electrode which is also preferably tubular and surrounds the aluminum electrodes in the electrolyte, a communication being established between the electrodes by means of suitable insulating tubing through which cold water, air, or other suitable cooling fluid is circulated. By this means, I am able to utilize very inexpensive electrodes and, at the same time, very materially improve the efficiency and operating characteristics of the device.

Figure 1:
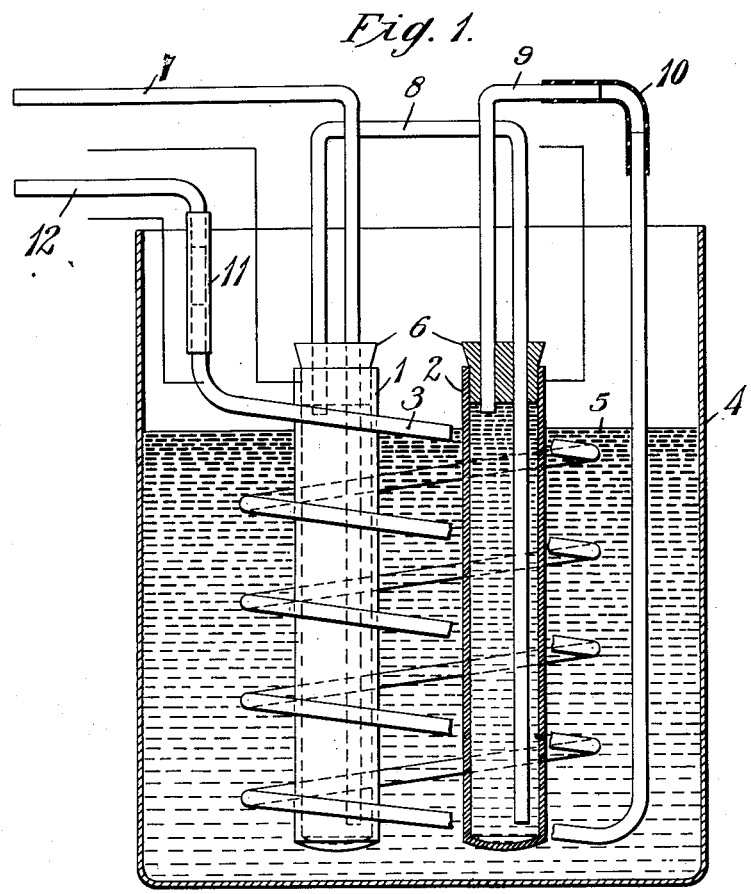
Figure 2:
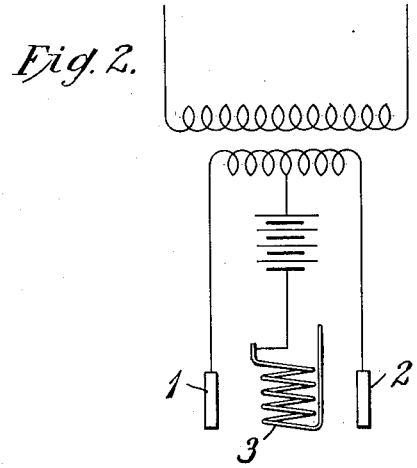

Figure 1, of the accompanying drawings, is a partially sectional elevation of an electrolytic rectifier embodying my invention, and Fig. 2 is a diagrammatic view showing the circuit connections therefor.

Referring to the drawings, the device here shown comprises tubular electrodes 1 and 2 of aluminum or other suitable material that is capable of producing an electrolytic valve action, a cooling coil 3, which may be formed of lead or some other suitable material to constitute an electrode; and a tank or receptacle 4 in which any suitable electrolyte 5 is contained.

The electrodes 1 and 2 are alike and each of them comprises a tubular member that is closed at the lower end and is provided, at its upper end, with a stopper 6 having holes through which project tubes 7, 8 and 9 of glass or other suitable material. The tubes 1 and 2 are disposed vertically in the electrolyte, with the stoppers above the liquid level, and are preferably surrounded by the cooling coil electrode 3.

The tube 7 projects through one of the holes in the stopper 6 of electrode 1, almost to the bottom of the tube. The U shaped tube 8, having legs of unequal length, forms a communication between the top of electrode 1 and the bottom of electrode 2, the shorter leg projecting through one of the holes of the stopper of tube 1 and the longer leg through one of the holes of the stopper of the electrode 2.

The top of the electrode 2 is connected, through tube 9, to the coil electrode 3, insulating joints 10 and 11 being provided for electrically isolating the electrode 3. Water or other cooling fluid is supplied from any suitable source, not shown, through tube 7 to the electrode 1, circulation being established from the bottom of this electrode upward through the tube 8 to the bottom of the electrode 2 and from thence upward and through the tube 9 and the coil electrode 3 to an outlet tube 12. By this means the heat generated in the electrodes 1 and 2, which has heretofore been only partially dissipated, is carried off in a very simple and efficient manner, so that the temperature of the electrodes is maintained at a low value. If a conducting fluid, such as water, is employed for cooling the electrodes, the insulating tube connections 9, 10 and 11 should be relatively long to make the resistance through the cooling liquid between electrodes relatively high.

In the operation of electrolytic rectifiers, a large portion of the undesired heat is generated at the surface of the active film-forming electrode. While I do not desire to confine myself to any specific theory or explanation for this phenomenon, I believe that it depends on the fact that both during the formation and the dissolution of the rectifying film, which take place in each cycle, a momentary resistance is encountered by the current which manifests itself by a high heat generation.

By my construction, I not only obtain satisfactory cooling results by passing the cooling fluid first through the active, highly heated electrode and, subsequently, when its temperature is somewhat raised, passing it through the cooler inert electrodes, but I also locate the active electrode at the center of the receptacle and place the inert electrode between it and the wall. By this arrangement, the highly heated active electrode sets up a circulation of the electrolyte, the liquid rising at the center of the receptacle and descending at the walls thereof with attendant dissipation of considerable heat. In the zone where the ascending and descending currents are in contact, the electrolyte is in very slow motion. By locating the inert electrode in or near this zone, I may cause the amount of electrolyte that passes thereover per unit of area, to be considerably less than that passing over the active electrode. By the joint use of these two cooling methods, I am enabled to control the relative temperatures of the active and of the inert electrodes in any desired manner, in spite of their different rates of heat generation.

Since the heating of the electrodes, in devices heretofore constructed, has been one of the most troublesome features, I have, by eliminating this difficulty, very materially improved the efficiency and operating characteristics of the rectifier.

The circuit connections for the rectifier are outlined in Fig. 2 of the drawings and, since they are well known, I deem it unnecessary to describe them in detail.

Variations in size and arrangement of parts may, of course, be made, within the spirit and scope of my invention.

I claim as my invention:

1. In an electrolytic rectifier, the combination with a body of electrolyte, a pair of tubular film-forming electrodes, and a liquid-conducting tube between the top of one and the bottom of the other electrode, of a helical pipe electrode surrounding said tubular electrodes and having one end in communication with the interior of one of them, and means for connecting one of the tubular electrodes and the free end of the helical pipe electrode to a supply of cooling liquid.

2. The combination with a receptacle containing an electrolyte, of a plurality of electrodes submerged therein, said electrodes generating heat at their surfaces at different rates when current is passing therebetween, means for first passing a cooling fluid through the interior of an electrode having relatively large heat generating capacity, and for subsequently passing said cooling fluid through an electrode having relatively small heat-generating capacity.

3. In an electrolytic rectifier, the combination with a receptacle containing an electrolyte, of an active electrode of film-forming material submerged therein, an electrode of inert conducting material submerged therein, connections for passing current between said electrodes, and means for passing a cooling fluid through the interior of said active electrode and for subsequently passing it through the interior of the inert electrode.

4. In an electrolytic rectifier, the combination with a receptacle, of an electrolyte therein, an active electrode of high heat-generating capacity arranged in the central portion of said receptacle, an inert electrode of small heat-generating capacity arranged about said active electrode, and means for passing a stream of cooling fluid through said active electrode and for subsequently passing said cooling fluid through the inert electrode.

5. The method of cooling two electrodes of an electrolytic device which have different heat-generating capacities which comprises circulating the electrolyte over the electrode of high heat-generating capacity at a greater rate than over the electrode of low heat-generating capacity, and in addition, passing a stream of cooling fluid through the electrode of high heat-generating capacity and subsequently passing said cooling fluid through the electrode of low heat-generating capacity.

In testimony whereof, I have hereunto subscribed my name this 15th day of Dec., 1910.

LEWIS W. CHUBB.

Witnesses:
H. R. Edgecomb,
B. B. Hines.